United States Patent [19]
Halford et al.

[11] Patent Number: 5,947,209
[45] Date of Patent: Sep. 7, 1999

[54] GROUND WORKING IMPLEMENT INCLUDING A SHANK AND A TIP

[76] Inventors: Christopher J. Halford; James W. Halford, both of Box 1420 Indian Head, Saskatchewan, Canada, S0G 2K0

[21] Appl. No.: 08/810,942

[22] Filed: Feb. 27, 1997

[51] Int. Cl.⁶ .................................................. E02F 3/12
[52] U.S. Cl. ........................ 172/772.5; 172/714; 172/719; 172/752; 172/753; 172/769; 37/454; 37/456
[58] Field of Search ................................. 172/701.3, 706, 172/714, 719, 725, 749, 750, 752, 753, 769, 772, 772.5, 713; 111/149, 153, 156; 37/452, 454, 455, 456; 403/361, 383

[56] References Cited

U.S. PATENT DOCUMENTS

| | | |
|---|---|---|
| 306,895 | 10/1884 | Ball . |
| 768,640 | 8/1904 | Tower .................................... 172/772.5 |
| 1,172,553 | 2/1916 | Pistek et al. ............................. 172/772 |
| 3,002,574 | 10/1961 | Padrick . |
| 3,386,517 | 6/1968 | Kelley . |
| 4,013,130 | 3/1977 | Wirt et al. ............................. 172/713 X |
| 4,269,274 | 5/1981 | Robertson et al. .................. 172/749 X |
| 4,415,042 | 11/1983 | Cosson . |
| 4,501,079 | 2/1985 | Hahn et al. ........................ 172/701.3 X |
| 4,550,512 | 11/1985 | Felstet ............................... 172/701.3 X |
| 4,576,239 | 3/1986 | Launder ................................ 172/752 X |
| 4,799,823 | 1/1989 | Williams ............................... 172/772 X |
| 4,823,884 | 4/1989 | McCall .................................. 172/719 X |
| 4,867,248 | 9/1989 | Robertson et al. ...................... 172/753 |
| 4,932,478 | 6/1990 | Jones . |
| 5,077,918 | 1/1992 | Garman . |
| 5,119,888 | 6/1992 | Hall ................................... 172/772.5 X |
| 5,165,487 | 11/1992 | Williams et al. ................. 172/772.5 X |
| 5,224,555 | 7/1993 | Bain et al. . |
| 5,310,009 | 5/1994 | Rowlett . |
| 5,787,994 | 8/1998 | Friesen ................................. 172/772.5 |

FOREIGN PATENT DOCUMENTS

| | | | |
|---|---|---|---|
| 2069081 | 1/1996 | Canada . | |
| 389735 | 11/1973 | U.S.S.R. ................................. 172/706 |
| 1234641 | 7/1986 | U.S.S.R. ................................. 172/706 |
| 1360601 | 12/1987 | U.S.S.R. ................................. 172/769 |
| 678382 | 9/1952 | United Kingdom . | |

*Primary Examiner*—Victor Batson
*Attorney, Agent, or Firm*—Adrian D. Battison; Murray E. Thrift

[57] ABSTRACT

A shank and replaceable tip of a ground working implement are defined from flat plate which is cut by laser or similar or is stamped to provide interconnecting elements between the replaceable tip and the lower end of the shank. At the lower end of the shank is provided a pocket defined by a recess cut into the lower end and a pair of plates welded on respective sides of the flat plate so that the projection of the replaceable tip extends into the pocket to hold the tip in place. This allows a rugged construction of the tip and various designs of tip can be manufactured simply by reprogramming the cutting process. A guide surface is mounted on the front plate of the shank with that guide surface defining a channel member with a leading edge increasing in radius of curvature from the lower end of the shank upwardly to a top of the guide surface spaced upwardly from the ground. This increase in width of the guide surface assists in discarding trash.

20 Claims, 5 Drawing Sheets

GROUND WORKING IMPLEMENT INCLUDING A SHANK AND A TIP

This invention relates to a ground working implement for an agricultural machine of the type comprising a shank which is mounted at an upper end onto a shank support of the agricultural machine and includes a lower portion for receiving a tip thereon.

BACKGROUND OF THE INVENTION

It is known to provide shanks of this type in the form of a vertical plate defined by a flat metal plate which is cut so that one edge of the flat plate defines a leading edge of the shank and the opposite edge of the flat plate defines a trailing edge with two side surfaces of the flat plate defining sides of the shank.

More conventional types of shank include cast metal elements of various shapes and a flat metal strip which has the flat side facing forwardly and is generally curved in side elevation to form a C-shape.

Various techniques are used for mounting a tip at the lower end of the shank. In many cases the tip includes a plate parallel to the lower end of the shank which is simply bolted to the shank. Other arrangements include various forms of cast metal tip often with a pocket so that a lower end of the shank is received within the pocket with the tip being held in place by close fit between the pocket and the lower end of the shank as well as a pin or bolt.

Various examples of tips of the cast metal type are manufactured by Bourgault and Flexicoil in Canada.

Other techniques for attachment of the tip to the shank include separate attachment pieces which are generally cast and are attached to the lower end of the shank and receive various tips which include elements for engagement into a pocket defined by the attachment piece.

Various arrangements of this type are shown in U.S. Pat. No. 5,224,555 (Bain) issued Jul. 6, 1993; U.S. Pat. No. 4,932,478 (Jones) issued Jun. 12, 1990; U.S. Pat. No. 5,310,009 (Rowlett) issued May 10, 1994; U.S. Pat. No. 5,077,918 (Garman) issued Jan. 7, 1992 and U.S. Pat. No. 306,895 (Ball) issued Oct. 21, 1884.

SUMMARY OF THE INVENTION

It is one object of the present invention to provide an improved ground working implement.

According to one aspect of the invention there is provided a ground working implement for an agricultural machine comprising:

a shank including an upper mounting portion for attachment to a shank support of the agricultural machine and a lower portion spaced downwardly of the upper mounting portion;

and a replaceable tip arranged for mounting on the lower portion for support thereby for movement therewith across the ground and for engagement into the ground in a ground working action;

the lower portion of the shank and the tip including cooperating engagement elements by which the tip is attached to the lower portion of the shank;

the engagement elements comprising a pocket on one of the lower portion and the tip and a projection for engagement into the pocket on the other of the lower portion and the tip;

at least the lower portion of the shank and at least part of the tip each being defined by a flat plate of substantially constant thickness between two flat side surfaces of the flat plate;

the lower portion being arranged such that the two flat side surfaces define sides thereof and such that leading and trailing edges of the lower portion are defined by cut edges of the flat plate;

the tip being arranged such that the two flat side surfaces define sides thereof and such that leading and trailing edges of the tip are defined by cut edges of the flat plate;

the projection being arranged such that the two flat side surfaces define sides of the projection and such that front and rear edges of the projection are defined by cut edges of the flat plate;

the pocket comprising a recess shaped to receive the projection and having front and rear surfaces defined by cut edges of the flat plate and side surfaces each defined by a respective one of two enclosure members extending across the recess and attached to a respective flat surface of the flat plate.

Preferably the two enclosure members have surfaces facing inwardly into the recess which are flat.

Preferably each enclosure member extends substantially fully across a respective side of the recess so as to fully cover the side of the recess and provide an open mouth of the recess only at an end face thereof.

Preferably the enclosure members are welded to the side surfaces.

Preferably the pocket is on a bottom end of the lower portion of the shank and the projection is on an upper end of the tip although the opposite construction can be employed in some arrangements.

Preferably the shank is shaped at the lower portion such that a width thereof from the leading edge to the trailing edge is greater than the thickness of the flat plate.

Preferably the projection and the pocket each have front and rear surfaces which are similarly tapered.

According to a second aspect of the invention there is provided ground working implement for an agricultural machine comprising:

a shank including an upper mounting portion for attachment to a shank support of the agricultural machine and a lower portion spaced downwardly of the upper mounting portion;

a tip mounted on the lower portion for support thereby for movement therewith across the ground and for engagement into the ground in a ground working action;

and a guide surface on the shank extending from the lower portion upwardly toward the upper mounting portion, the guide surface increasing in width transversely of the shank from a narrow width at the lower portion to an increased width upwardly from the lower portion.

Preferably the guide surface comprises a front surface of a cover member mounted on the shank and attached to the shank.

Preferably the guide surface is shaped such that in each of a series of horizontal cross sections spaced upwardly of the shank the guide surface defines a smoothly curved leading edge.

Preferably the cover member is attached to the shank at the lower portion.

Preferably the shank comprises a flat plate with the cover member mounted in front of a leading edge of the flat plate.

One embodiment of the invention will now be described in conjunction with the accompanying drawings in which:

BRIEF DESCRIPTION OF THE DRAWINGS

FIG. 9 is a cross sectional view along the lines 9—9 of FIG. 8.

In the drawings like characters of reference indicate corresponding parts in the different figures.

DETAILED DESCRIPTION

Figure 1:
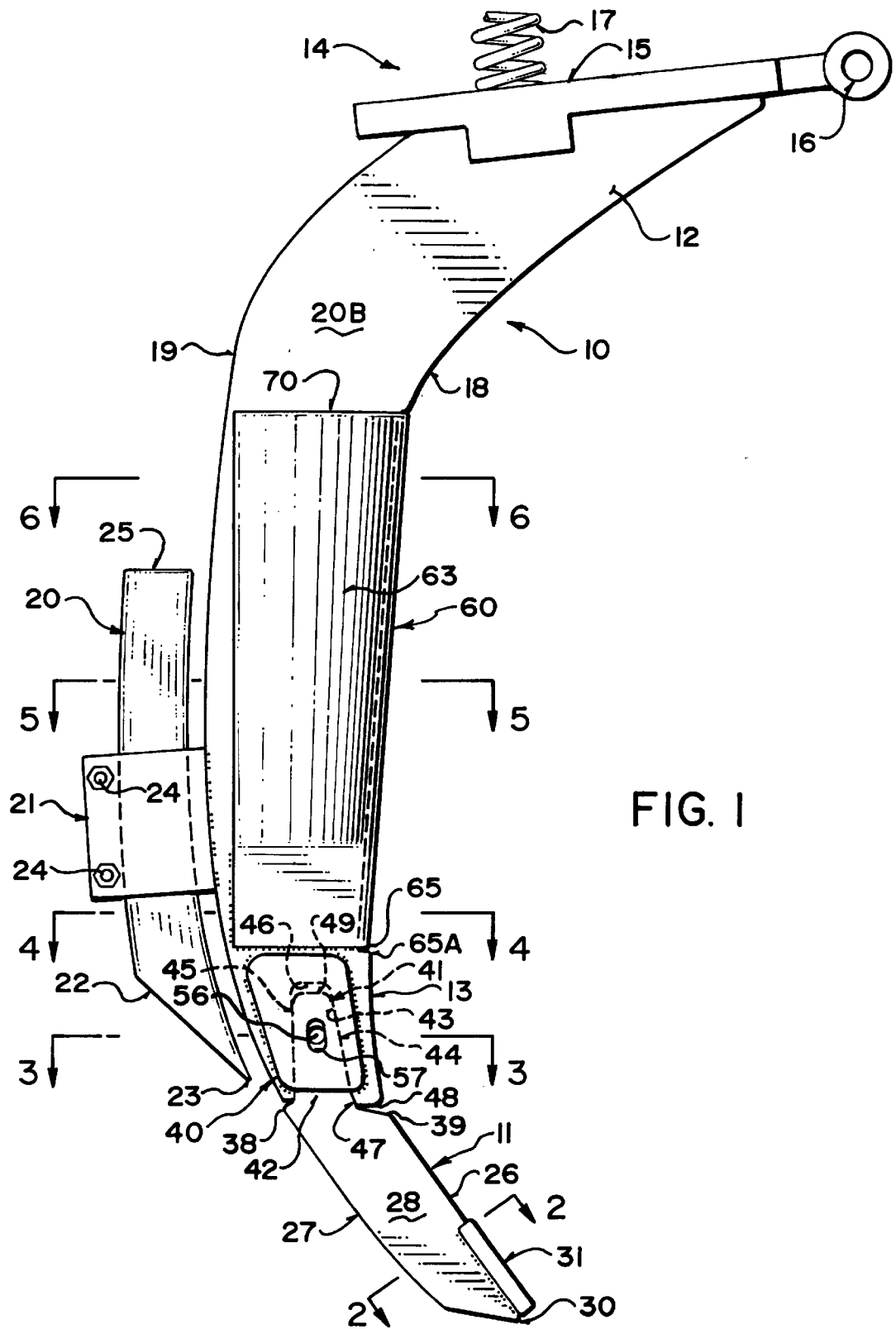
FIG. 1 is a side elevational view of a ground working implement according to the present invention.
Figure 2:
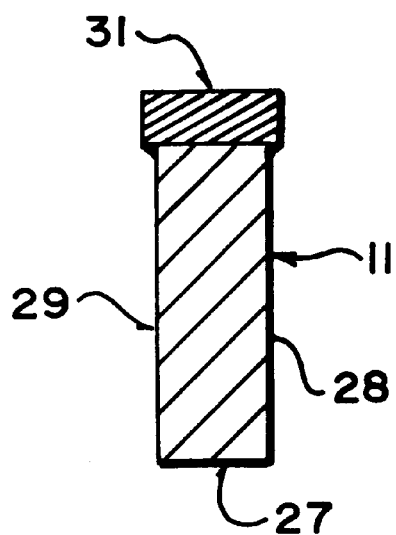
FIG. 2 is a cross sectional view along the lines 2—2 of FIG. 1.
Figure 3:
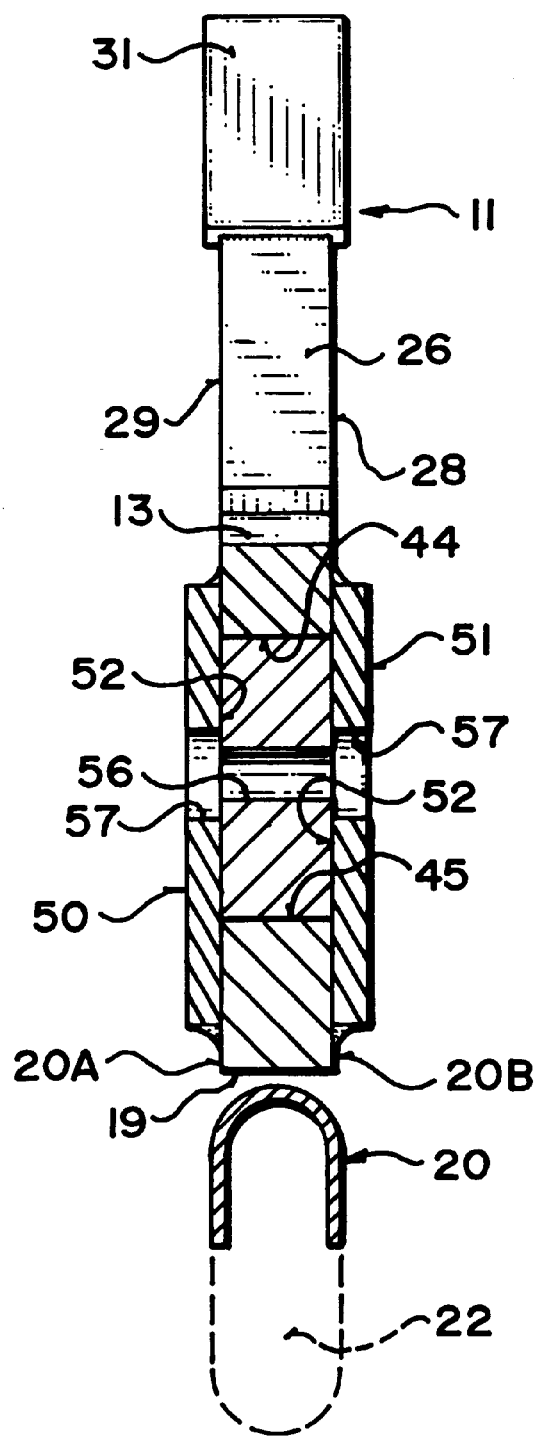
FIG. 3 is a cross sectional view along the lines 3—3 of FIG. 1.

The ground working implement shown in the figures comprises a shank 10 and a replaceable tip 11. The shank 10 extends from an upper mounting portion 12 to a lower portion 13 for attachment to the replaceable tip 11.

The upper mounting portion 12 is attached to suitable support of an agricultural machine, which support is not shown in detail as this can vary with requirements and is well known to one skilled in the art. For example the support can be fixed or can be a pivotal trip arrangement 14 biased by a spring or by a hydraulic action. The trip arrangement is shown including a bracket assembly 15 for attachment to the upper end 12, a pivot section 16 which allows pivotal movement of the trip and shank about a horizontal axis transverse to the direction of movement of the agricultural machine and a spring 17 for applying downward pressure on the shank and allowing upward release or trip movement of the shank in response to engagement with an obstacle in the ground.

Both the shank 10 and the replaceable tip 11 are defined by a flat metal plate. In the embodiment shown the plate defining the shank is equal in thickness to the plate defining the tip and this is the preferred arrangement although this is not essential to the construction.

The shank 10 thus includes a front or leading edge 18 and a trailing edge 19 both of which are made by cutting to shape from the flat metal sheet or plate defining the material of the shank. Thus side surfaces 20A and 20B of the plate define side surfaces of the shank. The width of the shank from the leading surface 18 to the trailing surface 19 is greater than the thickness of the shank. In this way the shank is substantially rigid in the front to back direction and is resistant to bending or damage due to impact with obstacles. Attached to the trailing surface 19 is an optional delivery tube 20 carried on a bracket 21 welded to the surface 19 at a position spaced upwardly from the bottom end of the shank. The tube 20 includes a rearwardly facing mouth 22 which is inclined downwardly and forwardly to a forward most apex 23 just behind the lower edge of the shank. The bracket 21 wraps around the tube 20 and is clamped thereto by bolts 24. The tube can be arranged for attachment to a supply tube for supplying seed or fertilizer as required for passage through an open upper mouth 25 of the tube.

The replaceable tip 11 is similarly manufactured from the flat plate to define a leading edge 26 and a trailing edge 27 together with side surfaces 28 and 29. The replaceable tip is aligned with the shank so that the side surfaces 28 and 29 lie in a common vertical plane with the side surfaces 20A and 20B of the shank. The replaceable tip converges forwardly and downwardly to a leading edge 30 which thus defines a knife for engaging into the ground and forming a furrow. Along the leading surface 26 is provided a wear plate 31 formed of a wear resistant material which is welded into place along a recess in the leading surface 26. The length and arrangement of the wear insert and the shape of the tip can vary significantly depending upon requirements.

The engagement of the tip with the lower end of the shank is effected by a pair of engagement elements generally indicated at 40. These include a pocket 41 and a projecting insert 42. The pocket 41 is comprised of a recess 43 cut into the lower end of the shank so as to define front and rear surfaces 44 and 45 of the recess together with an upper most surface of the recess indicated at 46. The front and rear surfaces 44 and 45 taper gradually and constantly from an open mouth 47 at a lower face 48 of the shank upwardly and inwardly to the base 46 which is thus narrower than the open mouth 47.

The projection 42 is similarly shaped with front and rear surfaces which taper at the same rate as those of the recess and converge to an upper edge 49 of the projection which is spaced from the base 46 so that the projection can be wedged in place within the recess. This leaves shoulders 38 and 39 on either side of the projection 42 which are slightly spaced downwardly from the lower most surface 48 of the shank.

The pocket 41 is closed on each side by a pair of plates 50 and 51 each arranged on a respective side of the shank and covering the recess. The plates 50 and 51 have inside surfaces 52 which are flat and which lie flat against the side surfaces 20A and 20B of the shank. This defines sides of the recess which thus substantially contact sides of the projection of the tip so that projection is held in place within the recess by a close fit. A slight clearance can be provided by slightly spacing the plates 50 and 51 outwardly from the side surfaces of the shank to ensure that manufacturing tolerances do not prevent the projection from engaging into the recess.

The projection is locked into the recess by a transverse pin 55 which engages through a circular hole 56 in the projection 42. Holes 57 in the side plates 50 and 51 are oval so as to be necessarily aligned with the circular hole when the surfaces of the projection are wedged in place within the surfaces of the recess. The fact that the pin is therefore loose within the holes 57 allows some vertical movement of the tip relative to the shank but in operation the upward force on the tip forces the projection of the tip into the recess so that the location of the tip is defined by the wedging action of the projection within the recess rather than the location of the pin 55.

Figure 8:
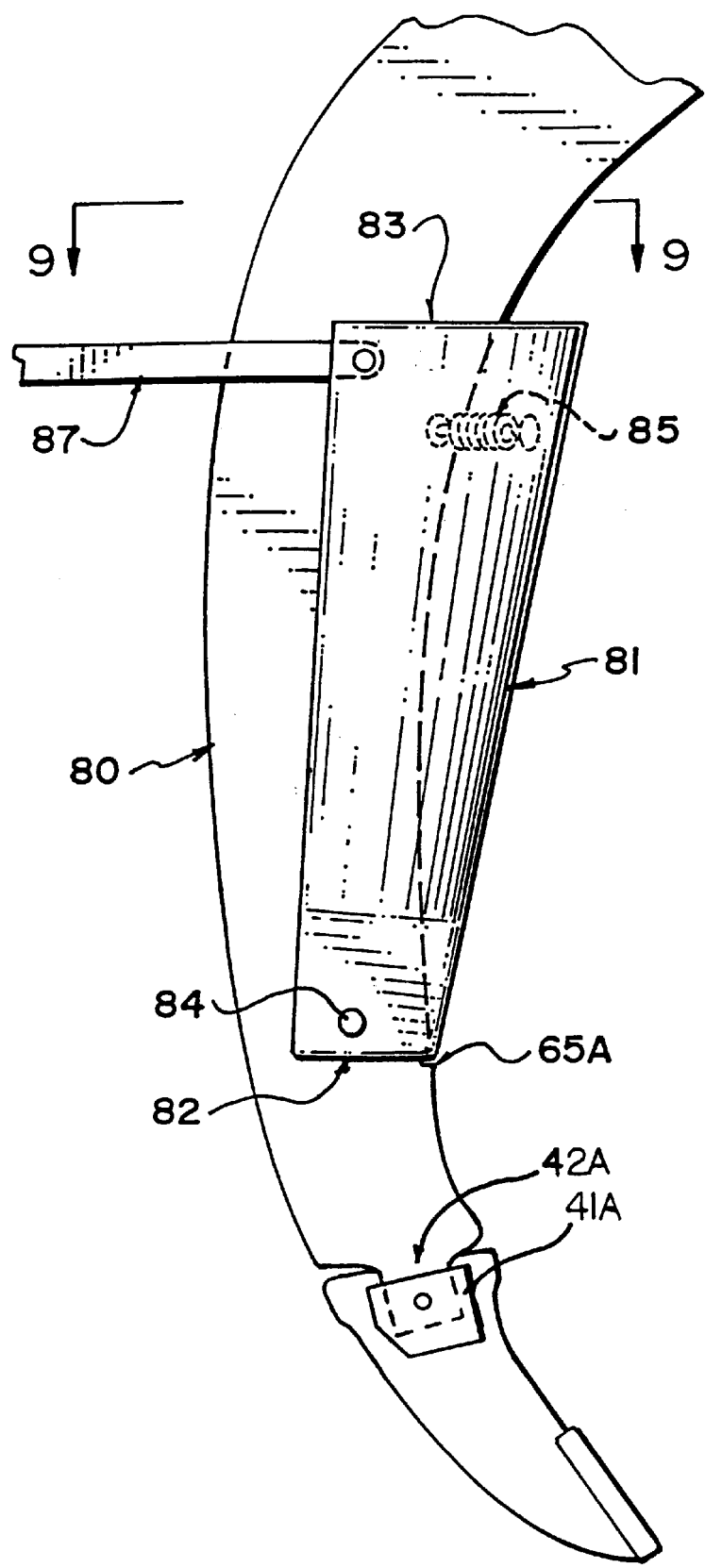
FIG. 8 is a side elevational view similar to that of FIG. 1 showing a modified ground working implement according to the present invention.

In an alternative arrangement shown in FIG. 8 the pocket 41A is provided on the tip and the projection 42A on the shank. However this is not preferred since the tip is replaceable and therefore is manufactured as simply as possible as shown in the illustrated embodiment.

The shank and the tip are preferably defined by laser cutting of the leading and trailing edges so as to provide an accurate shape with that shape being variable simply by reprogramming the operation of the laser cutter. However other types of cutting and/or punching of a plate material can also be used. Laser cutting is particularly preferred for lower numbers of production. However if numbers are sufficient tooling can be manufactured for direct punching of the required shape.

The shank and the tip are thus made from the flat plate which is aligned so that the plane of the flat plate lies in the direction of movement of the agricultural machine. The shank is thus relatively narrow and can in some cases therefore avoid collecting material in front of the shank. However in situations where significant level of trash, that is remaining crop material is present in and on the soil, a guide surface is provided in front of the shank so as to assist in discarding the trash and preventing the trash from collecting in front of the upper part of the shank. The guide surface is indicated at 60 and comprises a generally U shaped wall with a base of the U forming a leading edge and two legs of the U extending rearwardly on each side of the shank.

Figure 4:
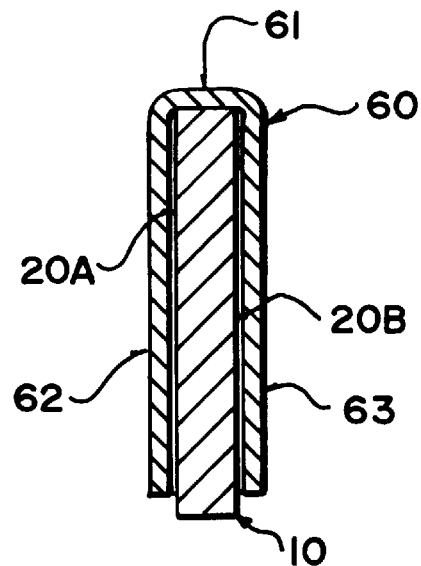
FIG. 4 is a cross sectional view along the lines 4—4 of FIG. 1.
Figure 5:
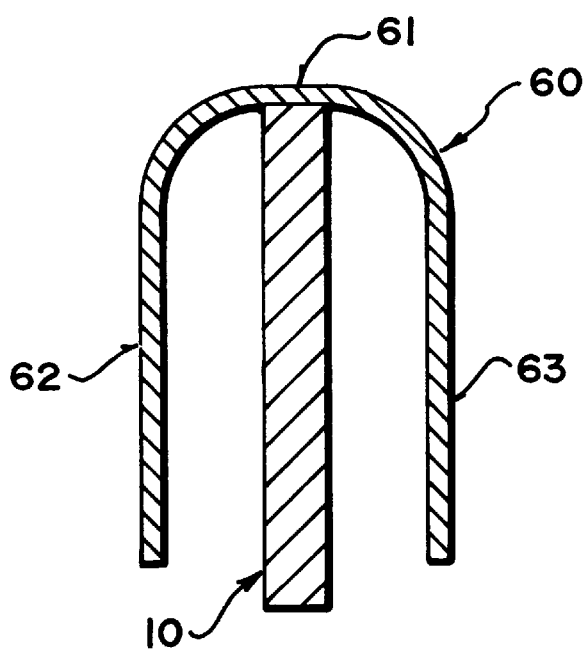
FIG. 5 is a cross sectional view along the lines 5—5 of FIG. 1.
Figure 6:
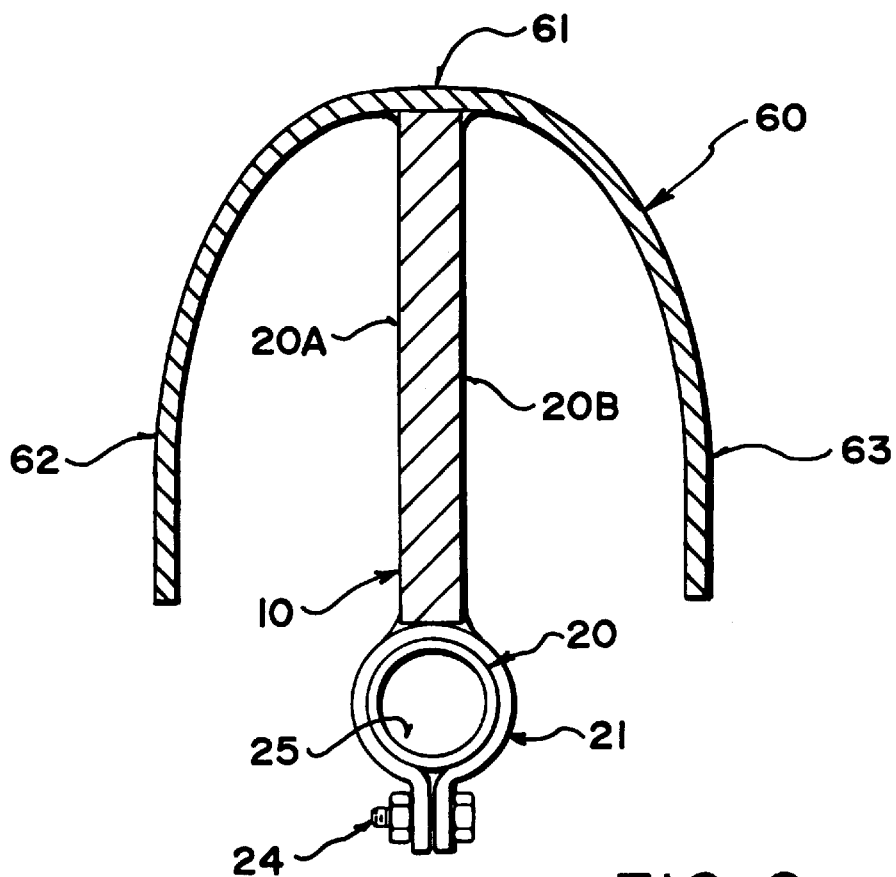
FIG. 6 is a cross sectional view along the lines 6—6 of FIG. 1.

Thus in cross section as shown in FIGS. 4, 5 and 6, the base of the U shape is indicated at 61 and the two legs are indicated at 62 and 63. It will be appreciated therefore that the U shape member is relatively elongate so as to extend from a position just above the side plates 50 and 51 to a position spaced upwardly from the lower end of the shank at a height sufficient on the shank to engage any crop materials or trash carried in front of the shank.

At the lower most end of the guide 60, the legs 62 and 63 are clamped inwardly so that they lie closely adjacent the side surfaces 20A and 20B of the shank 10. The lower most edge of the guide as indicated at 65 is welded to the side surfaces 20A and 20B so as to hold the guide in place on the shank.

Figure 7:
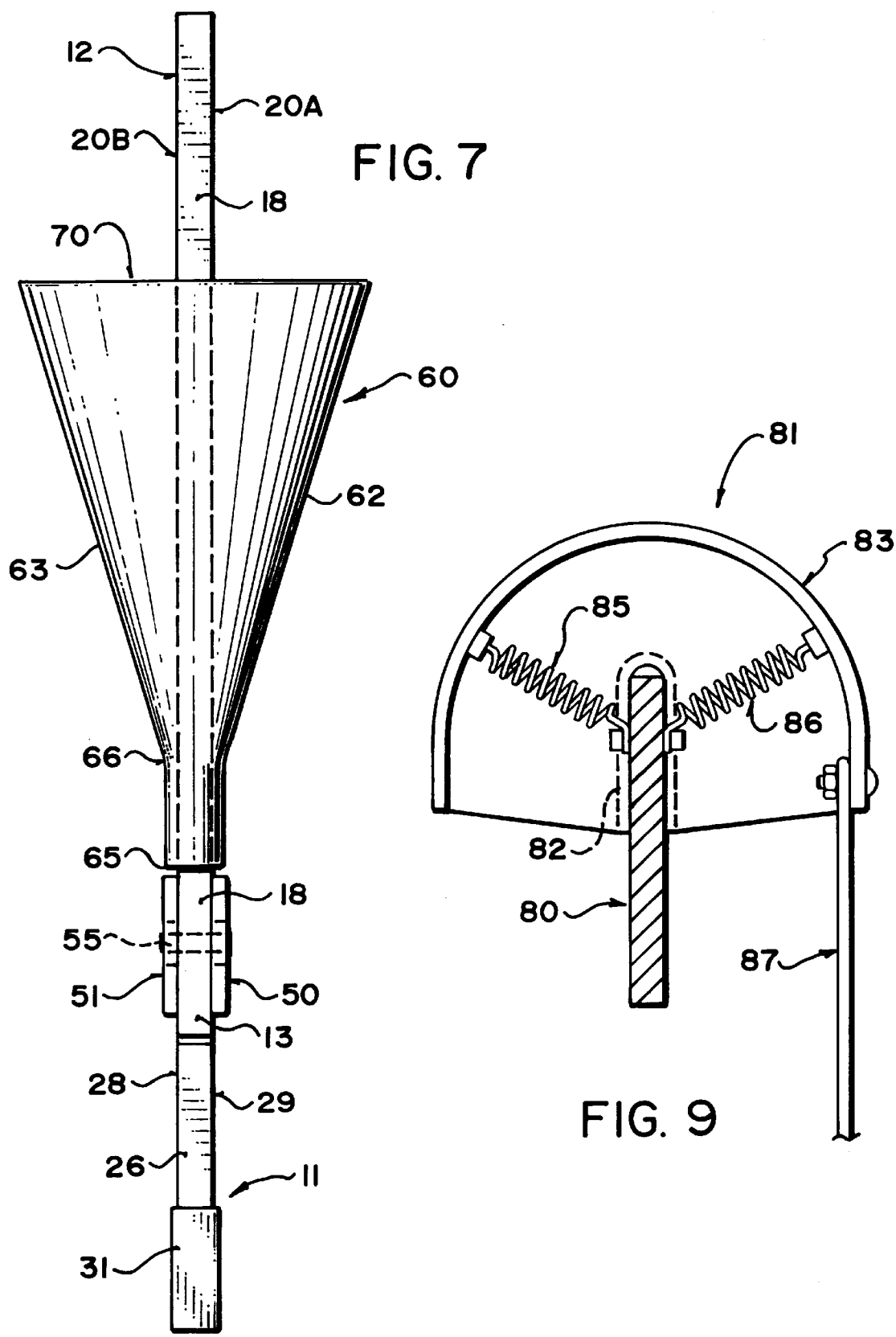
FIG. 7 is a front elevational view of the ground working implement of FIG. 1.

As best shown in FIG. 7, the lower part of the guide includes a section in which the leg 62 and 63 are parallel such that each lies alongside the side surfaces of the shank. This section extends from the lower most edge 65 up to a first junction 66. From that point the guide flares outwardly so that the legs 62 and 63 gradually increase in spacing as indicated in FIGS. 5 and 6. The leading edge or base of the U shape member or channel as indicated at 61 is curved in cross section as shown in FIGS. 5 and 6. The guide can also be shaped so that it starts to increase in width directly at the lower edge 65 without the parallel portions of the legs. The front edge of the shank has a recess or shoulder 65A so that the leading edge of the shank above the tip is contiguous with the leading edge of the guide at the lower edge 65.

This shape of the guide surface causes crop material which initially wraps around the lower part between the points indicated at 65 and 66 to gradually move up the shank and to be discarded in view of the fact that the curvature of the leading edge 61 gradually increases thus reducing the likelihood of the material hanging up on that leading edge. Thus there is a tendency for the crop material to rise up or ride up the front edge of the shank and for that material to be discarded as it reaches the upper edge 70 of the guide.

In an alternative arrangement (not shown), the shank itself can be shaped in this manner rather than being formed of the single flat plate so that the upper part of the shank is defined in effect by the guide surface and the lower part of the shank is defined by the flat plate allowing its attachment to the replaceable tip as previously described. The guide can also be used with a shank which is manufactured by conventional techniques and does not use the plate type construction described above.

The arrangement as described above provides the following features:

1. It provides considerable strength in that the manufacture can utilize plate steels of high wear resistance and strength.

2. It is inexpensive to vary the design of either the shank or the tip since the cutting action can be effected by torch, plasma or laser using computer design techniques. Stamping or punching of the parts from a plate can also be used.

3. The manufacture avoids the heavy start up costs of tooling for casting molds and the like.

4. A large number of different tip shapes can be developed to fit varying seeding, tillage, fertilizing and insecticide injection requirements.

5. The width of the tip and the width of the shank can be relatively narrow lying in the range 0.125 to 1.00 inch or greater.

6. The attachment of the tip to the shank can be effected by the tapered wedging action described above, by a curve shape or by rectangular or parallel sides arrangement.

7. The side plates welded to the shank can be reduced in height if required in dependence upon the expected forces and finished ground shape required.

8. Various additions can be made to the tips to widen furrows, reduce wear behind openers on delivery tubes etc.

9. The tip can be made into a tillage tool by bolting or welding on a horizontal wing sections.

10. The lower portion of the shank can be provided as a separate section which can be bolted to another portion of the shank.

In a further alternative arrangement, the shank can be of a conventional design on which a lower portion is added as a bolt-on conversion section onto which the tip mounts. The conversion section and the tip are then defined by the plate arrangement as described hereinbefore. The lower portion does not therefore need to be an integral part of the upper part of the shank but it can be seperately manufactured and attached thereto.

Turning now to FIGS. 8 and 9, there is shown a further shank construction which is preferably of the plate type previously described but can be of any other shank type. The shank is generally indicated at 80 and includes a cover member 81 which is similar to the cover member 60 previously described. In this arrangement, however, the cover tapers continuously from a lower edge 82 up to an upper edge 83 so that the cover gradually increases in width and the radius of curvature of the front edge of the cover gradually increases to provide a crop shedding action as previously described.

Instead of the cover 81 being welded to the shank, in this case the cover 81 is attached to the shank by a bolt 84 which allows some pivotal movement of the cover about an axis defined by the transverse bolt 84 passing through the shank. The bolt is arranged near the lower edge 82 so that the lower edge is substantially fixed and received within the recess 65A as previously described. However the upper edge 83 can move forwardly and rearwardly relative to the shank and in addition can move slightly from side to side relative to the shank due to a relatively loose fit on the transverse bolt 84. In order to maintain the cover in position in front of the shank and relatively centered on the shank, the cover is attached by a pair of rubber or spring couplings 85 and 86 which extend from a position adjacent the front edge of the shank outwardly and forwardly to a respective mounting points on the cover. Thus the springs pull the cover backwardly toward the front edge of the shank but allow some forward movement and allow some side to side shaking movement.

In one embodiment, therefore, the cover is in effect loosely mounted on the shank so that it can float in various directions as the shank moves or vibrates to assist trash from being released from the front surface of the cover.

In addition, or alternatively, the cover can be attached to a linkage generally indicated at 87 which extends from the cover to a movable element of the agricultural machine for example trailing packer wheels or other opener members which will generate sharp forces on the cover member and cause it to snap forward and/or sideways helping to dislodge residues or trash. One example of a seeding device of this general type is shown in prior Canadian Patent 1239835 issued Aug. 2nd 1988 of James W. Halford (one of the present inventors) in which the shank is trailed by an attached packer wheel which is allowed some movement relative to the shank. The connection of the linkage 87 therefore to the trailing packer wheel will cause some shaking or more vigorous movement of the cover member relative to the front surface of the shank to assist in discarding the trash.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A ground working implement for an agricultural machine comprising:

a shank including an upper mounting portion for attachment to a shank support of the agricultural machine and a lower portion spaced downwardly of the upper mounting portion;

and a replaceable tip arranged for mounting on the lower portion for support thereby for movement therewith across the ground and for engagement into the ground in a ground working action;

the lower portion of the shank and the tip including cooperating engagement elements by which the tip is attached to the lower portion of the shank;

at least the lower portion of the shank being defined by a first flat plate of substantially constant thickness between two flat side surfaces of the first flat plate;

the lower portion being arranged such that the two flat side surfaces define sides of the lower portion and such that leading and trailing edges of the lower portion are defined by cut edges of the first flat plate;

at least part of the tip being defined by a second flat plate of substantially constant thickness between two flat side surfaces of the second flat plate;

the tip being arranged such that the two flat side surfaces define sides of the tip and such that cut edges of the second flat plate are arranged at leading and trailing edges of the tip;

the engagement elements comprising a pocket on one of the first and second flat plates and a projection, for engagement into the pocket, on the other of the first and second flat plates;

the pocket comprising:

a recess cut in said one of the first and second flat plates to define cut edges thereof such that front and rear surfaces of the recess are defined by said cut edges of said one of the first and second flat plates;

and two parallel spaced enclosure members defining sides of the recess, each enclosure member being attached to a respective flat side surface of said one of the first and second flat plates so as to at least partly span the recess.

2. The ground working implement according to claim 1 wherein the two enclosure members are flat so as to define inner surfaces facing inwardly into the recess which are co-planar with the flat side surfaces of said one of the first and second flat plates.

3. The ground working implement according to claim 1 wherein each enclosure member extends substantially fully across a respective side of the recess so as to substantially fully cover the side of the recess.

4. The ground working implement according to claim 1 wherein each of the enclosure members is welded to the respective side surface of the flat plate of said one of the lower portion and the tip.

5. The ground working implement according to claim 1 wherein the pocket is arranged on a bottom end of the lower portion of the shank and the projection is arranged on an upper end of the tip such that the enclosure members are mounted on the sides surfaces of the lower portion of the shank adjacent the bottom end thereof.

6. The ground working implement according to claim 5 wherein the shank includes a guide cover mounted on the shank at a position spaced upwardly from the tip and extending from the lower portion upwardly toward the upper mounting portion, the guide cover comprising a sheet member curved so as to be U-shaped in horizontal cross-section thus defining a curved leading wall surrounding the leading edge of the shank and two side walls each adjacent to a respective side surface of the shank, the guide cover having at a lower end thereof each side wall thereof arranged immediately alongside and parallel to the respective side surface of the shank and substantially immediately above the enclosure members to define a narrow width of the cover at the lower end substantially contiguous with the enclosure members; and the guide cover increasing in width transversely of the shank from the narrow width at the lower end to an increased width upwardly from the lower end.

7. The ground working implement according to claim 1 wherein the shank is shaped at the lower portion such that a width thereof from the leading edge to the trailing edge is greater than the thickness of the first flat plate.

8. The ground working implement according to claim 1 wherein the pocket has front and rear surfaces which are tapered and the projection has front and rear surfaces which are tapered and shaped to fit against the front and rear surfaces of the pocket when the projection is inserted into the pocket.

9. The ground working implement according to claim 1 wherein the shank includes a guide cover mounted on the shank at a position spaced upwardly from the tip and extending from the lower portion upwardly toward the upper mounting portion, the guide cover comprising a sheet member curved so as to be U-shaped in horizontal cross-section thus defining a curved leading wall surrounding the leading edge of the shank and two side walls each adjacent to a respective side surface of the shank, the guide cover having at a lower end thereof each side wall thereof arranged immediately alongside and parallel to the respective side surface of the shank to define a narrow width of the guide cover at the lower end; and the guide cover increasing in width transversely of the shank from the narrow width at the lower end to an increased width upwardly from the lower end.

10. A ground working implement for an agricultural machine comprising:

a shank including an upper mounting portion for attachment to a shank support of the agricultural machine and a lower portion spaced downwardly of the upper mounting portion;

a tip mounted on the lower portion for support thereby for movement therewith across the ground and for engagement into the ground in a ground working action;

the shank being defined by a first flat plate of substantially constant thickness between two flat side surfaces of the first flat plate arranged such that the two flat side surfaces define sides of the shank and such that leading and trailing edges of the shank are defined by edges of the first flat plate;

the tip having a soil engaging width along its length from the shank to a lowermost edge which is substantially equal to that of the first flat plate of the shank so as to form a knife for cutting a narrow furrow;

and a guide cover mounted on the shank at a position spaced upwardly from the tip and extending from the lower portion upwardly toward the upper mounting portion;

the guide cover comprising a sheet member curved so as to be U-shaped in horizontal cross-section thus defining a curved leading wall surrounding the leading edge of the shank and two side walls each adjacent to a respective side surface of the shank;

the guide cover having at a lower end thereof each side wall thereof arranged immediately alongside and parallel to the respective side surface of the shank to define a narrow width of the cover at the lower end; and the guide cover increasing in width transversely of the shank from a the narrow width at the lower end to an increased width upwardly from the lower end.

11. The ground working implement according to claim 10 wherein the guide cover is connected to the shank for flexible movements relative to the shank.

12. The ground working implement according to claim 11 wherein there is provided a linkage for effecting movement of the guide cover relative to the shank.

13. A ground working implement for an agricultural machine comprising:

a shank including an upper mounting portion for attachment to a shank support of the agricultural machine and a lower portion spaced downwardly from the upper mounting portion;

and a replaceable tip arranged for mounting on the lower portion for support thereby for movement therewith across the ground and for engagement into the ground in a ground working action;

the lower portion of the shank and the tip including cooperating engagement elements by which the tip is attached to the lower portion of the shank;

at least the lower portion of the shank being defined by a first flat plate of substantially constant thickness between two flat side surfaces of the first flat plate;

the lower portion being arranged such that the two flat side surfaces define sides of the lower portion and such that leading and trailing edges of the lower portion are defined by cut edges of the first flat plate;

at least part of the tip being defined by a second flat plate of substantially constant thickness between two flat side surfaces of the second flat plate;

the first flat plate and the second flat plate being of substantially equal thickness;

the tip being arranged such that the two flat side surfaces of the second flat plate define sides of the tip and such that cut edges of the second flat plate are arranged at leading and trailing edges of the tip;

the engagement elements comprising a pocket on one of the first and second flat plates and a projection, for engagement into the pocket, on the other of the first and second flat plates;

the pocket comprising a recess cut in said one of the first and second flat plates such that front and rear surfaces of the recess are defined by cut edges of said one of the first and second flat plates and two parallel spaced enclosure members defining sides of the recess, each enclosure member being attached to a respective flat side surface of said one of the first and second flat plates so as to at least partly span the recess and each having a substantially flat inner surface co-planar with the respective flat side surface of said one of the first and second flat plates;

the projection on said other of the first and second flat plates being integral with said other of the first and second flat plates such that the two flat side surfaces of said other of the first and second flat plates define respective sides of the projection and such that front and rear edges of the projection are defined by cut edges of said other of the first and second flat plates.

14. The ground working implement according to claim 13 wherein each enclosure member extends substantially fully across a respective side of the recess so as to substantially fully cover the side of the recess.

15. The ground working implement according to claim 13 wherein each of the enclosure members is welded to the respective side surface of said one of the first and second flat plates.

16. The ground working implement according to claim 13 wherein the pocket is arranged on a bottom end of the lower portion of the shank and the projection is arranged on an upper end of the tip.

17. The ground working implement according to claim 13 wherein the shank is shaped at the lower portion such that a width thereof from the leading edge to the trailing edge is greater than the thickness of the first flat plate.

18. The ground working implement according to claim 17 wherein the shank includes a guide cover mounted on the shank at a position spaced upwardly from the tip and extending from the lower portion upwardly toward the upper mounting portion, the guide cover comprising a sheet member curved so as to be U-shaped in horizontal cross-section thus defining a curved leading wall surrounding the leading edge of the shank and two side walls each adjacent to a respective side surface of the shank, the guide cover having at a lower end thereof each side wall thereof arranged immediately alongside and parallel to the respective side surface of the shank and substantially immediately above the enclosure members to define a narrow width of the cover at the lower end substantially contiguous with the enclosure members; and the guide cover increasing in width transversely of the shank from the narrow width at the lower end to an increased width upwardly from the lower end.

19. The ground working implement according to claim 13 wherein the pocket has front and rear surfaces which are tapered and the projection has front and rear surfaces which are tapered and shaped to fit against the front and rear surfaces of the pocket when the projection is inserted into the pocket.

20. The ground working implement according to claim 13 wherein the shank includes a guide cover mounted on the shank at a position spaced upwardly from the tip and extending from the lower portion upwardly toward the upper mounting portion, the guide cover comprising a sheet member curved so as to be U-shaped in horizontal cross-section thus defining a curved leading wall surrounding the leading edge of the shank and two side walls each adjacent to a respective side surface of the shank, the guide cover having at a lower end thereof each side wall thereof arranged immediately alongside and parallel to the respective side surface of the shank to define a narrow width of the cover at the lower end; and the guide cover increasing in width transversely of the shank from the narrow width at the lower end to an increased width upwardly from the lower end.

* * * * *